United States Patent [19]

Wallen

[11] Patent Number: 4,861,091
[45] Date of Patent: Aug. 29, 1989

[54] GLARE REDUCING ADJUSTABLE VISOR SYSTEM

[76] Inventor: Russell J. Wallen, 1810 Hayes St. NE., Minneapolis, Minn. 55418

[21] Appl. No.: 233,211

[22] Filed: Aug. 17, 1988

[51] Int. Cl.<sup>4</sup> ............................................. B60J 3/02
[52] U.S. Cl. .................................. 296/97.6; 296/97.8; 296/97.7
[58] Field of Search ................... 296/97.6, 97.8, 97.11, 296/97.7

[56] References Cited

U.S. PATENT DOCUMENTS

| 2,603,530 | 7/1952 | Jones | 296/97.6 |
|---|---|---|---|
| 2,802,693 | 8/1957 | Lauve | 296/97.8 |
| 2,855,242 | 10/1958 | Holmes | 296/97.7 |
| 4,248,474 | 2/1981 | Mandrick | 296/97.8 |
| 4,317,589 | 3/1982 | Kuss | 296/97.7 |
| 4,351,557 | 9/1982 | Chary | 296/97.7 |
| 4,353,593 | 10/1982 | Henson | 296/97.7 |
| 4,736,979 | 4/1988 | Harvey | 296/97.8 |
| 4,792,176 | 12/1988 | Karford | 296/97.8 |
| 4,810,023 | 3/1989 | Kawada | 296/97.8 |

Primary Examiner—Robert R. Song
Attorney, Agent, or Firm—Merchant, Gould, Smith, Edell, Welter & Schmidt

[57] ABSTRACT

A glare reducing adjustable visor system is provided for use in a windowed vehicle. The visor system comprises a visor means with a chamber therein for receipt of a removable visor plate. The visor plate may be arranged as a glare reducing extension of the visor means or removed from the visor means and mounted independently on a window of the vehicle. The visor system comprises a combined tongue and groove engaging mechanism and handle means. The visor system also includes redundant stop means for preventing undesired movement of the visor plate out of the visor means.

15 Claims, 2 Drawing Sheets

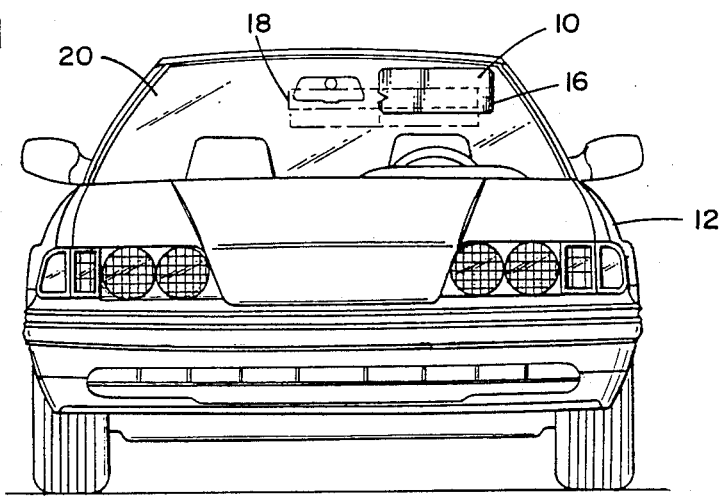
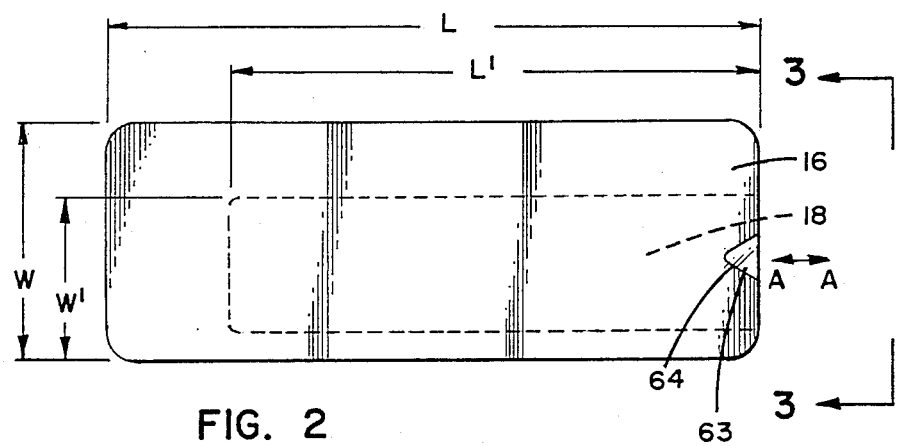
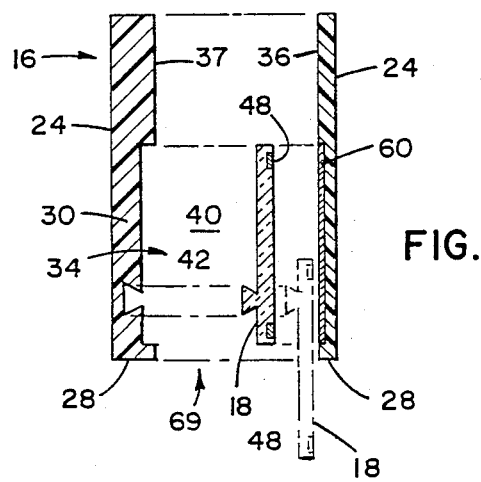

GLARE REDUCING ADJUSTABLE VISOR SYSTEM

FIELD OF THE INVENTION

The present invention relates generally to the field of visor systems for use in vehicles and more specifically to a glare reducing adjustable visor system having a combined tongue and groove engaging mechanism and handle means.

BACKGROUND OF THE INVENTION

Visor systems are provided in most windowed vehicles to reduce glare created by environmental conditions, headlights of other vehicles, or other causes. Numerous visor systems have been developed which typically provide a glare reducing area defined by variously shaped visor members. Some visors include primary and secondary members, with the secondary members being constructed for attachment to or insertion into the primary member. Generally, visors having a multiple member construction are not readily utilized while operating the vehicle and its windows. Also, such visor systems frequently lack sufficient means for preventing unwanted detachment of secondary members from primary members.

What has been needed, therefore, has been an adjustable glare reducing visor system which is readily operable within a windowed vehicle and which includes means for securely repositioning a portion of the visor system.

SUMMARY OF THE INVENTION

The present invention is a glare reducing adjustable visor system for use in a windowed vehicle. The visor system comprises visor means attached to the interior of the vehicle and a visor plate. The visor means includes outer surfaces defining a glare reducing area, a bottom surface, a first end surface defining an opening, and inner surfaces defining a chamber which extends from the first end surface opening and includes a groove portion of a tongue and groove engaging mechanism. The visor plate includes handle means constructed for holding the visor plate, the handle means also comprising the tongue portion of the tongue and groove engaging mechanism. The tongue and groove engaging mechanism permits secure positioning of the visor plate in the visor means chamber. When the visor plate is removed from the visor means, the handle means facilitates positioning of the visor plate onto a window in the interior of the vehicle.

BRIEF DESCRIPTION OF THE DRAWINGS

FIG. 1 is a front elevation view of a visor system according to the present invention shown mounted proximate a windshield of a vehicle.

FIG. 2 is a rear elevation view of a visor means according to the present invention.

FIG. 3 is a side cross section exploded view taken generally along line 3—3, FIG. 2, illustrating the tongue and groove relation between the visor plate and the visor means formed, in part, by the protruding handle means.

DETAILED DESCRIPTION OF THE PREFERRED EMBODIMENTS

Figure 4:
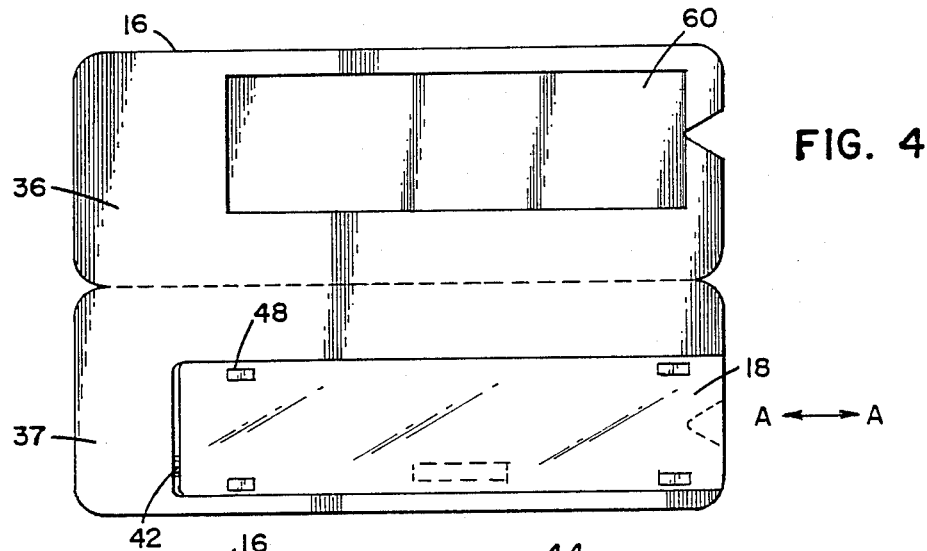
FIG. 4 is a top plan view of a separated visor system according to the present invention illustrating a first inner surface of the visor means defining a chamber.

Detailed preferred embodiments of the present invention are disclosed herein. It is to be understood, however, that the disclosed embodiments are merely exemplary of the invention, which may be embodied in various forms. Therefore, specific structural and functional details disclosed are not to be interpreted as limiting, but rather as a representative basis for teaching one skilled in the art to variously employ the present invention in virtually any appropriately detailed system or structure. It will be understood that in some circumstances relative material thicknesses and relative component sizes may be shown exaggerated to facilitate an understanding of the invention.

Referring to FIG. 1, an adjustable visor system 10 according to the present invention is shown mounted within a windowed vehicle 12. Visor system 10 comprises visor means 16 and a visor plate 18. Preferably, visor means 16 is attached to the interior of vehicle 12 proximate a window such as windshield 20 of vehicle 12. Visor plate 18 is constructed and arranged for storage in visor means 16 and for partial removal therefrom to provide a glare reducing adjustable visor system for use in representative windowed vehicle 12. As will be further detailed, visor plate 18 may also be fully removed from visor means 16 and removably affixed onto a selected window independent of visor means 16.

FIG. 2 is a rear elevation view of visor means 16 configured for positioning in a windowed vehicle in a manner analogous to that shown in FIG. 1. More particularly, FIG. 2 illustrates the slidable relation between visor means 16 and visor plate 18. Preferred visor means 16 comprises a length L and a width W. Similarly, preferred visor plate 18 comprises a length L' and a width W'.

Referring to FIG. 3, visor means 16 and visor plate 18 are illustrated in side cross sectional view. Visor means 16 comprises outer surfaces 24 with, preferably, a length L and a width W defining glare reducing areas, a bottom surface 28, and a first end surface 30 which defines an opening 34. Visor means 16 further comprises first inner surface 36 and second inner surface 37 which define a chamber 40 extending from first end surface opening 34 through a length L' within visor means 16. Second inner surface 37 of visor means 16 further includes a groove portion 42 comprising part of a tongue and groove engaging mechanism.

As illustrated in FIG. 3, visor plate 18 includes handle means 44 for holding visor plate 18 upon removal from visor means 16. Handle means 44 also functions as the tongue portion of the tongue and groove engaging mechanism which guides visor plate 18 in slidable cooperation with visor means 16 in chamber 40. The glare reducing adjustable visor system 10 further includes means for attaching visor plate 18 to an interior window of windowed vehicle 12. Preferably the means for attaching comprises magnetic attaching means 48 positioned within the areas defined by the window of vehicle 12 and visor plate 18. FIGS. 3 and 4 further illustrate a preferred visor plate retaining means 60. Visor plate retaining means 60 preferably comprises material which is constructed and arranged on either first inner surface 36 or second inner surface 37 of chamber 40 to attract visor plate 18 and to prevent any unwanted movement of visor plate 18 out of first end surface opening 34. As illustrated, visor plate retaining means 60 is positioned on first inner surface 36.

In operation, adjustable visor system 10 provides readily usable glare reducing surfaces for use in a windowed vehicle. The tongue and groove engaging mechanism, formed by handle means 44 and groove 42, is constructed and arranged to permit slidable movement of visor plate 18 along an axis, depicted by line A—A, FIG. 2, which is substantially parallel to visor means 16 bottom surface 28. This configuration permits the partial removal of visor plate 18 from visor means 16 to provide additional glare reducing surface extending from first end surface 30. This extension is accomplished by gripping the portion 63 of visor plate 18 which is exposed by arcuate groove 64. Arcuate groove 64 is preferably located proximate first end surface 30 of visor means 16. Use of arcuate groove 64 facilitates gripping visor plate 18 when visor plate 18 is fully inserted in chamber 40. Moreover, this configuration facilitates storage of visor plate 18 completely within visor means 16, thereby preventing inadvertent contact with any portion of visor plate 18 which might otherwise be extending from visor means 16. This feature aids in reducing any undesired repositioning of portions of visor system 10.

Figure 5:
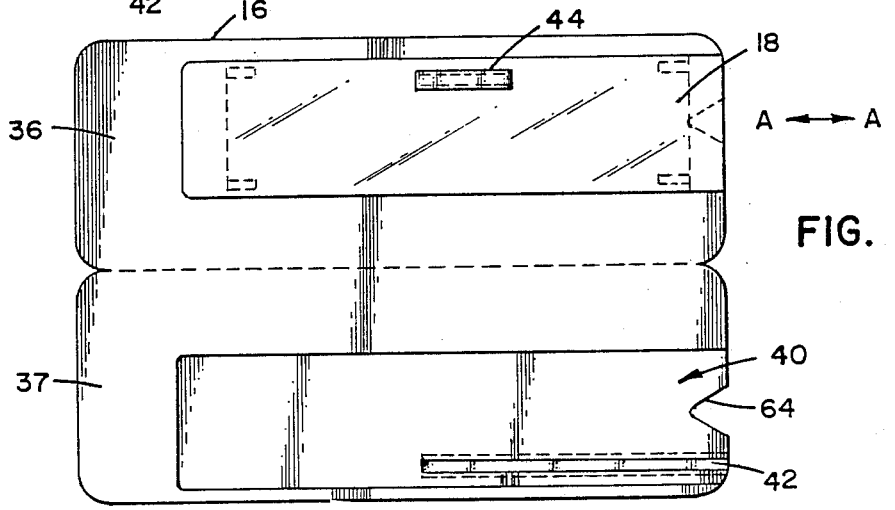
FIG. 5 is a top plan view of a separated visor system according to the present invention illustrating a second inner surface of the visor means defining a chamber.

Referring to FIGS. 1, and 5, it is observed how visor plate 18 may be removed, inverted, and reinserted into chamber 40. The inclusion of an elongate aperture 68 extending from visor means first end surface opening 34 along a substantial portion of length L' on bottom surface 28 allows use of visor plate 18 to further extend the glare reducing surface of visor system 10 beyond bottom surface 28. Elongate aperture 68 is sized to permit passage of visor plate 18 therethrough when visor plate 18 is removed from a position within visor means 16, inverted, and reinserted into visor means 16 in cooperation with the tongue and groove mechanism. However, in the inverted position, handle means 44 and visor means groove 42 continue to cooperate to form a tongue and groove mechanism which prevents slippage of visor plate 18 out of visor means 16.

Figure 6:
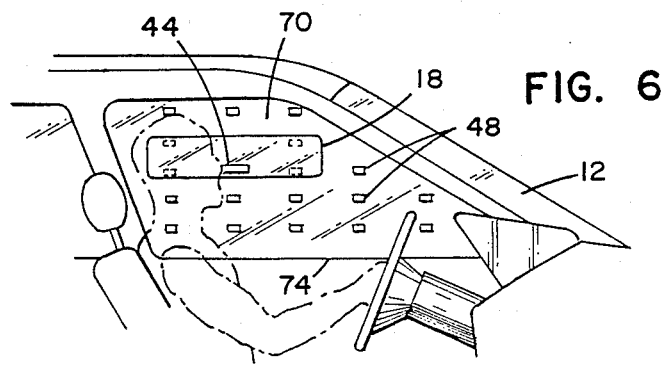
FIG. 6 is a side elevation view of a representative vehicle side window illustrating a visor plate magnetically mounted onto the interior of the window.

FIG. 6 is a side elevation view of a representative vehicle 12 with visor plate 18 mounted on a side window 70. Means for mounting visor plate 18 comprise magnetic attaching means 48 positioned within the area defined by side window 70. Corresponding magnetic attaching means 48 consequently attract and hold visor plate 18 on side window 70. It is appreciated that magnetic attaching means 48 may be arranged in different patterns on different windows. As illustrated in FIG. 6, a preferred arrangement of magnetic attaching means 48 permits mounting of visor plate 18 at various selected positions to reduce glare through side window 70. Preferred visor plate 18 may be readily repositioned on side window 70 by handle means 44. Both handle means 44 and visor plate 18 are preferably constructed of glare reducing material, such as translucent or polarized plastic. Also, substantially transparent magnetic attaching means of the type in U.S. Pat. No. 4,248,474 may be integrally constructed with the glare reducing material. This preferred construction allows visibility to be maintained through visor plate 18 and handle means 44, as well as providing a lightweight and durable visor plate 18.

A further advantage of adjustable visor system 10 resides in mounting visor plate 18 onto side window 70 so that the visor system functions substantially independent of window movement and is protected from forces external to the vehicle. More specifically, an arrangement of magnetic attaching means 48, or other means for attaching visor plate 18 to a window of vehicle 12, which prevents access to magnetic attaching means 48 from the exterior of the vehicle, prevents movement of such attaching means by wind, rain, vandals, or other causes. Means for attaching visor plate 18 to any of the windows in vehicle 12 includes magnets embedded in each window or windows constructed of magnetized material. The arrangement of magnetic attaching means 48 on side window 70 illustrates a manner of mounting visor plate 18 so that visor system 10 functions substantially independent of window movement. This is accomplished by handle means 44 contacting a portion 74 of vehicle 12 which is adjacent to each window. This contact occurs when window 70 is moved from a full up position to a lower position. As window 70 is lowered, handle means 44 contacts portion 74 of vehicle 12 while, simultaneously, magnetic attaching means 48 on visor plate 18 seeks corresponding magnetic attaching means 48 within window 70 for attachment. Accordingly, handle means 44 prevents visor plate 18 from being trapped in the portion of vehicle 12 which retains a window 70 in the lowered position.

It is to be understood that while certain embodiments of the present invention have been illustrated and described, the invention is not to be limited to the specific forms or arrangements of parts described and shown above, since others skilled in the art may devise other embodiments still within the limits of the claims.

What is claimed is:

1. A glare reducing adjustable visor system for use in a windowed vehicle comprising:
    (a) visor means attached to the interior of the vehicle, the visor means having outer surfaces defining glare reducing areas, a bottom surface, a first end surface defining an opening, and inner surfaces defining a chamber extending from the first end surface opening and including a groove portion of a tongue and grove engaging mechanism; and
    (b) a visor plate having surfaces defining a glare reducing area, the visor plate having:
        (1) handle means for holding the visor plate, the handle means also comprising the tongue portion of the tongue and groove engaging mechanism for positioning the visor plate in the visor means chamber; and,
        (2) means for attaching the visor plate to a window in the interior of the vehicle.

2. A visor system according to claim 1 wherein the tongue and groove engaging mechanism is constructed and arranged to permit slidable movement of the visor plate along an axis parallel to the visor means bottom surface so that additional glare reducing surface extends from the first end surface of the visor means.

3. A visor system according to claim 2 wherein the visor means bottom surface includes an elongate aperture extending from the visor means first end surface opening, the aperture being sized to permit passage of the visor plate therethrough when the visor plate is removed from a position within the visor means, inverted, and re-inserted into the visor means in cooperation with the tongue and groove mechanism, the inverted visor plate providing an additional glare reducing surface extending from the visor means bottom surface.

4. A visor system according to claim 1 wherein the visor means first end surface includes an arcuate groove to facilitate gripping the visor plate when the visor plate is fully inserted in the visor means.

5. A visor system according to claim 1 further comprising a visor plate retaining means comprising material which is constructed and arranged on an inner surface of the visor means chamber to attract the visor plate and to prevent slippage of the visor plate out of the first end surface opening.

6. A system according to claim 1 wherein the means for attaching the visor plate to an interior window comprises magnetic attaching means positioned within the areas defined by the window of the vehicle and the visor plate.

7. A glare reducing adjustable visor system for use in a windowed vehicle comprising:
(a) visor means attached to the interior of the vehicle, the visor means having outer surfaces defining a glare reducing area, a bottom surface, a first end surface defining an opening, and inner surfaces defining a chamber extending from the first end surface opening and including a groove portion of a tongue and groove engaging mechanism;
(b) a translucent visor plate defining a glare reducing area, the visor plate including handle means constructed and arranged to facilitate positioning of the visor plate onto windows of the vehicle, the handle means also comprising the tongue portion of the tongue and groove engaging mechanism for slidably locating the visor plate within the visor means chamber; and
(c) magnetic attaching means positioned within the areas defined by the windows of the vehicle and in the visor plate, the magnetic attaching means permitting magnetic attachment of the glare reducing visor plate onto the windows at various predetermined locations from the interior of the vehicle so that the visor system functions substantially independent of window movement and is protected from forces external to the vehicle.

8. A visor system according to claim 7 wherein the tongue and groove engaging mechanism is constructed and arranged to permit slidable movement of the visor plate along an axis parallel to the visor means bottom surface so that additional glare reducing surface extends from the first end surface of the visor means.

9. A visor system according to claim 8 wherein the visor means bottom surface includes an elongate aperture extending from the visor means first end surface opening, the aperture being sized to permit passage of the visor plate therethrough when the visor plate is inverted and inserted into the visor means in cooperation with the tongue and groove mechanism, the inverted visor plate providing an additional glare reducing surface extending from the visor means bottom surface.

10. A visor system according to claim 9 wherein the visor means first end surface includes an arcuate groove to facilitate gripping the visor plate when the visor plate is fully inserted in the visor means.

11. A visor system according to claim 10 further comprising a visor plate retaining means comprising material which is constructed and arranged on an inner surface of the visor means to magnetically attract the visor plate and to prevent slippage of the plate out of the first end surface opening.

12. A glare reducing adjustable visor system for use in a windowed vehicle comprising:
(a) visor means attached to the interior of the vehicle, the visor means having outer surfaces defining a glare reducing area, a bottom surface, a first end surface defining an opening, and inner surfaces defining a chamber extending from the first end surface opening and including a groove portion of a tongue and groove engaging mechanism;
(b) a translucent visor plate defining a glare reducing area, the visor plate including handle means constructed and arranged to facilitate positioning of the visor plate onto windows of the vehicle, the handle means also comprising the tongue portion of the tongue and groove engaging mechanism for slidably locating the visor plate within the visor means chamber;
(c) magnetic attaching means positioned within the areas defined by the windows of the vehicle and in the visor plate, the magnetic attaching means permitting magnetic attachment of the glare reducing visor plate onto the windows at various predetermined locations from the interior of the vehicle so that the visor system functions substantially independent of window movement and is protected from forces external to the vehicle; and
(d) stop means for preventing undesired movement of the visor plate within the visor means chamber.

13. A visor system according to claim 12 wherein the visor means bottom surface includes an elongate aperture extending from the visor means first end surface opening, the aperture being sized to permit passage of the visor plate therethrough when the visor plate is inverted and inserted into the visor means in cooperation with the tongue and groove mechanism, the inverted visor plate providing an additional glare reducing surface extending from the visor means bottom surface 14. A visor system according to claim 13 wherein the stop means comprises:
(a) a tongue and groove mechanism constructed and arranged to allow movement of the visor plate solely along an axis parallel to the visor means bottom surface thus preventing slippage of the visor plate out of the visor means bottom surface elongate aperture; and,
(b) visor plate retaining means comprising an inner surface of the visor means having material constructed and arranged to attract the visor plate thus preventing slippage of the visor plate out of the visor means first end surface opening.

15. A visor system according to claim 14 wherein the stop means further comprises an arcuate groove located in the visor means proximate the first end surface, the arcuate groove providing means for gripping the visor plate when the visor plate is fully positioned within the visor means thereby preventing undesired movement of the visor plate by contact with a portion of the vehicle adjacent the visor means.

* * * * *